US 6,729,267 B2

(12) United States Patent  
Campbell

(10) Patent No.: US 6,729,267 B2
(45) Date of Patent: May 4, 2004

(54) EXPANDABLE CORRAL FOR ATTACHMENT TO A HORSE TRAILER

(75) Inventor: Darrell D. Campbell, Welch, MN (US)

(73) Assignee: Prairie Ridge Partners, Buffalo Gap, SD (US)

(*) Notice: Subject to any disclaimer, the term of this patent is extended or adjusted under 35 U.S.C. 154(b) by 59 days.

(21) Appl. No.: 10/141,227

(22) Filed: May 7, 2002

(65) Prior Publication Data

US 2003/0209206 A1 Nov. 13, 2003

(51) Int. Cl.[7] ................................................. A01K 1/02
(52) U.S. Cl. ........................ 119/513; 119/513; 119/519
(58) Field of Search ................................ 119/513, 502, 119/512, 504, 514, 519, 522, 840, 843

(56) References Cited

U.S. PATENT DOCUMENTS

| | | | |
|---|---|---|---|
| 2,491,577 A | * 12/1949 | Olinger ........................ 256/25 |
| 2,678,629 A | 5/1954 | Meyer |
| 2,935,965 A | 5/1960 | Smith |
| 3,726,256 A | * 4/1973 | Bernhardt et al. .......... 119/512 |
| 3,741,529 A | 6/1973 | Blagg |
| 3,767,167 A | 10/1973 | Rasmussen |
| 3,921,585 A | * 11/1975 | Hall ........................... 119/512 |
| 3,970,045 A | 7/1976 | Graham, Jr. |
| 4,048,959 A | 9/1977 | Steele |
| 4,090,472 A | 5/1978 | York |
| 4,250,836 A | * 2/1981 | Smith ......................... 119/512 |
| 4,366,775 A | 1/1983 | Tyquin |
| 4,537,151 A | * 8/1985 | Bolton ........................ 119/512 |
| 4,619,223 A | 10/1986 | Koehn |
| 4,630,570 A | 12/1986 | Wilson et al. |
| 4,821,679 A | 4/1989 | Hackert |
| 4,924,813 A | * 5/1990 | Bixler et al. |
| RE33,959 E | 6/1992 | Mollhagen |
| 5,381,757 A | * 1/1995 | Putney ........................ 119/512 |
| 5,651,333 A | 7/1997 | Fisher |
| 6,067,940 A | * 5/2000 | Holder ........................ 119/512 |
| 6,450,124 B1 | 9/2002 | Calvert et al. |
| 6,467,433 B1 | * 10/2002 | Stanton et al. .............. 119/512 |
| 6,477,985 B1 | * 11/2002 | Mennenga et al. ......... 119/512 |
| 6,499,435 B2 | * 12/2002 | Markham .................... 119/512 |

* cited by examiner

Primary Examiner—Yvonne R. Abbott
(74) Attorney, Agent, or Firm—Gordon & Rees LLP

(57) ABSTRACT

A corral apparatus has a pair of mounting brackets for securing at spaced locations on a surface of a vehicle, livestock trailer, or building, a pair of side panels each having a first end pivotally connected to a respective bracket, and an end panel pivotally secured between the second ends of the side panels, whereby the apparatus can be pivoted between an operative condition in which each side panel extends transverse to the surface and the end panel extends between the ends of the side panels, and a storage position in which the panels are folded flat against one another and the surface. The side panels are adjustable in length to vary the size of the coral.

22 Claims, 3 Drawing Sheets

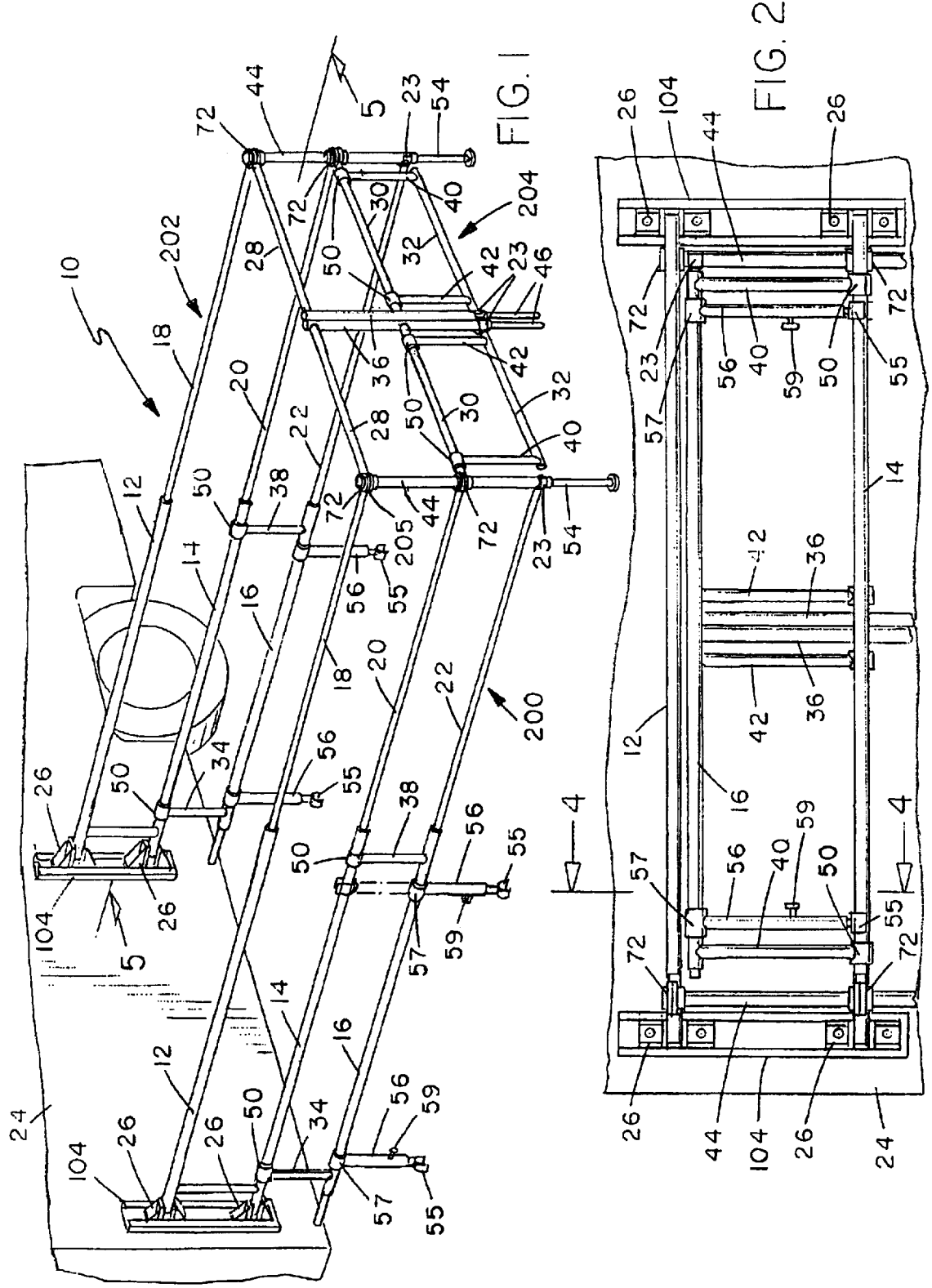

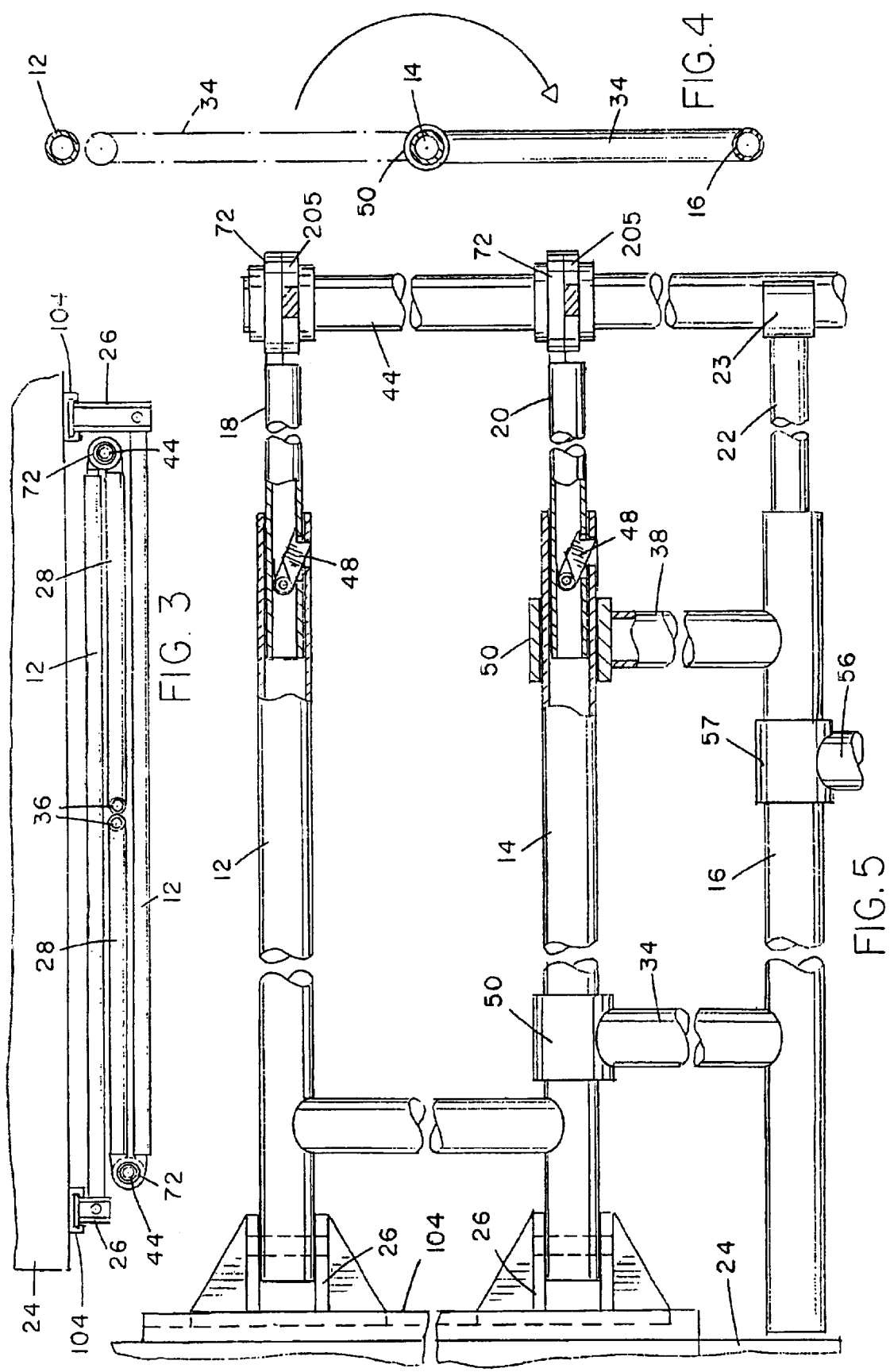

EXPANDABLE CORRAL FOR ATTACHMENT TO A HORSE TRAILER

BACKGROUND OF THE INVENTION

The present invention relates generally to corrals for horses or other animals, and is particularly concerned with a corral for attachment to a horse trailer or other animal transportation vehicle.

Horses used for competition and recreation are frequently transported via horse trailer to a variety of locations for such activities. Unfortunately, many of these locations either do not have facilities for horses to be stalled, the facilities are full, or the facilities are unsafe. Those traveling with horses, therefore, often bring along corral equipment that can be set up at the location for confining the horse. This equipment is either removably attached to the horse trailer or carried in the tow vehicle.

Materials often used in making these portable corrals include metal piping formed into fence panels, rope or electric wire, or woven plastic or rope. These materials are often connected to portable stakes driven into the ground to form fence posts.

Portable metal corrals have been used by those handling livestock for many years because of metal's durability and high-visibility to the animal. Specifically, many forms of portable corrals have been invented. Many of these corrals, however, are cumbersome due to multiple parts that must be lifted and removed from the trailer and require time-consuming assembly. For example, U.S. Pat. No. 4,537,151 to Bolton discloses that the corral assembly be hoisted with a winch along a vertical support pipe up onto mounting brackets. The corral assembly by Blagg, U.S. Pat. No. 3,741,529 is so weighty and cumbersome that it requires two men to load and unload the assembly from the horse trailer. Bernhardt, U.S. Pat. No. 3,726,256, requires that part of the assembly be placed on the roof of the trailer and parts of it be lifted onto a holding means on the side of the trailer.

There are times when the horse person may wish to adjust the size of the corral due to parking constraints or terrain concerns. In this situation, none of the above corrals could be made smaller or of un-uniform size.

Safety is the key concern of a person traveling with a horse. Some portable corrals on the market are of such a height or material that they allow a horse to reach over the top rail or under the bottom rail with its head in an attempt to graze, leading to an unsafe situation if the horse were to become startled. Additionally, the corral assembly may become damaged.

Fences are also used on people's property to contain and protect pets and children. Such fences are usually permanently installed with posts driven into the ground. A permanent fence may not be ideal in terms of cost, aesthetic concerns or for people who are not permanent residents of the property. Non-permanent fences in the past have been unstable and cumbersome to assemble.

People traveling in motor homes or with travel trailers often travel with their pets and children. Having a "yard" for the pets or children to play safely in would be advantageous. As space in such motor homes or travel trailers is often limited, such yard fencing would best be stored on the exterior of the vehicle in a compacted form.

SUMMARY OF THE INVENTION

It is an object of the present invention to provide a new and improved corral for temporary stabling and handling of livestock which can be mounted in a folded position on a horse trailer and then unfolded and expanded with ease. A further object of the invention is to provide a new and improved enclosure for attachment to other vehicles, such as recreational vehicles and other trailers. Additionally, the claimed invention may be attached to a home to provide a non-permanent fence to enclose pets or to prevent children from entering a dangerous area such as a pool.

According to the present invention, a corral apparatus is provided, which comprises a pair of mounting brackets for securing at predetermined spaced locations on a surface of a vehicle, trailer, or building, a first side panel having a first end pivotally secured to one of the mounting brackets and a second end, a second side panel having a first end pivotally secured to the other mounting bracket and a second end, each of the side panels being adjustable in length, and a third end panel extending between the second ends of the side panels, whereby an enclosure is formed by the surface, side panels, and end panel, the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface.

The end panel may be pivoted at one end to one of the side panels and releasably secured to the other side panel end. In an exemplary embodiment, the end panel is formed in two parts, one part pivoted to one of the side panels and the other part pivoted to the other side panel, with the two parts releasably connected together to provide a gate for entry and exit from the enclosure, as well as to allow the end panel to be collapsed against the side panels for storage.

The two side panels may each be formed from two telescoping or relatively slidable parts to allow for adjustment of the size of the corral. For example, one part or panel portion may have upper and lower channels on its inner or outer face slidably engaged with upper and lower bars on the other part or panel portion, which is offset outwardly or inwardly from the other panel portion so as to slide over it into a retracted position to reduce the corral size. In an exemplary embodiment of the invention, each side panel is formed from at least two parallel rails extending between vertical end posts, and each rail is formed from two telescopically engaged members to allow the length of the panel to be adjusted.

When the apparatus of this invention is secured to a vehicle such as a livestock or horse trailer, it may be readily stored flat against a wall of the trailer during transportation. Upon arrival at a destination, it can be deployed quickly and easily by one person, simply by folding out the side and end walls and adjusting to the desired size. The side and end panels in an exemplary embodiment are all formed by vertical tubular posts and horizontal tubular rails extending between the posts, and are of relatively lightweight construction, so that they can be deployed and collapsed easily by one person.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a perspective view of the corral structure according to an exemplary embodiment of the invention erected on the side of a horse trailer;

FIG. 2 is a side view of the corral structure folded and stored;

FIG. 3 is a top plan view of the folded structure of FIG. 2;

FIG. 4 is an enlarged sectional view taken on line 4—4 of FIG. 3;

FIG. 5 is a further enlarged sectional view taken on line 5—5 of FIG. 1, with portions cut away;

DETAILED DESCRIPTION OF THE DRAWINGS

Figure 6:
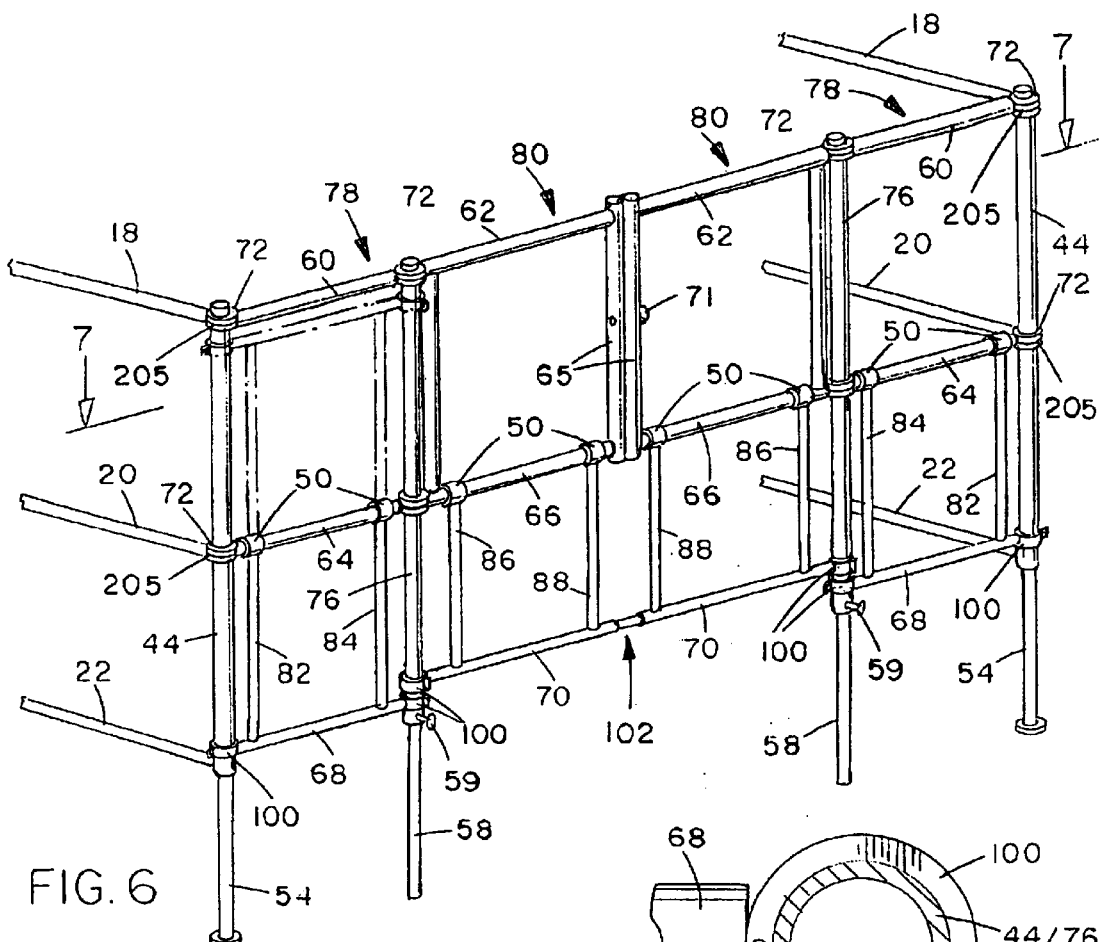
FIG. 6 is a perspective view of a portion of the erected structure, showing an alternative gate configuration.

FIGS. 1 to 5 illustrate a corral apparatus 10 according to a first embodiment of the invention mounted on a side wall or end wall of a livestock trailer 24, such as a horse trailer. Although the apparatus is illustrated mounted on a side wall of the trailer, it may alternatively be mounted on an end wall so that it extends from each side of an access door to the trailer. In this case, the trailer door may be left open to provide shelter for animals in the enclosure or to facilitate loading or unloading of animals. The corral apparatus may also be secured to a fixed building rather than a vehicle, to provide a temporary corral as needed, which can be stored flat when not in use.

The apparatus basically comprises a pair of mounting brackets 104 for mounting at spaced locations on the wall of a trailer 24 or a building, a pair of side panels 200, 202 each pivotally mounted at one end on one of the brackets 104 via hinges or pivot devices 26, as best illustrated in FIG. 5, and an end panel 204 extending between the opposite ends of side panels 200,202 to form an enclosure for animals when in the deployed position illustrated in FIG. 1. The panels are designed to be collapsed flat against the wall 24 for storage, as indicated in FIGS. 2 and 3, as will be explained in more detail below. The pivot devices 26 are slidably engaged in each mounting bracket 104 in the illustrated embodiment, to permit the corral apparatus to be removed completely from the trailer if desired. However, the devices may alternatively be permanently secured to the brackets 104 if removability of the corral apparatus is not necessary.

In the illustrated embodiment, each side panel comprises a set of spaced, parallel horizontal rails 12, 14 and 16 extending from the respective mounting bracket 104, and a vertical end post 44. The top and middle rails 12,14 are each pivotally connected at their first ends to the respective mounting bracket 104 by the pivot devices 26. Each rail 12,14,16 has a telescoping end portion 18,20,22 of reduced dimensions projecting from the end remote from mounting bracket 104, and each end portion is secured to the end post 44 at its outer end. As best illustrated in FIG. 5, end portions 18 and 20 are permanently secured to post 44 via fasteners 72, while the lower rail end portion 22 is releasably connected to post 44 via a U-shaped releasable clamp fastener 23, for example. The telescoping end portions allow the length of the respective side panel to be adjusted, between the fully extended condition illustrated in FIG. 1, and the fully collapsed position illustrated in FIGS. 2 and 3, in which the end portions are telescoped inwardly as far as possible into the rails 12, 14 and 16.

Each vertical post 44 has a lower leg 54 which is telescopically engaged in the remainder of the post, so that it can be extended to touch the ground for stability when the corral is deployed, while being retracted upwardly into the remainder of the post for storage purposes when the corral is not in use. Any suitable hand-tightening mechanism may be used to secure the leg 54 in the extended and retracted positions, such as a snap pin at each end of leg 54 for snap engagement in a hole in the post 44 in each of the end positions. Similarly, each lower rail 16 has a pair of legs 56 rotatably coupled to the rail 16 via collars 57, each having a U-shaped or horseshoe shaped bracket or clamp 55 at its lower end. Each leg can be rotated between a raised position in which it extends upwardly from rail 16 with bracket 55 engaged over the middle rail 14, as indicated in dotted outline in FIG. 1, and a lowered position in which it extends downwardly from rail 16 with the bracket 55 engaging the ground for added stability of the corral, as indicated in solid lines in FIG. 1. When the legs 56 are rotated upwardly about the collar 57, the bracket 55 may be retracted inwardly into each leg 56 by releasing pop pin 59 or other hand-tightening mechanism, so that each bracket or clamp 55 can engage around the rail 14 as indicated. The U or horse-shoe shaped clamps 55 will dig into relatively soft ground, such as turf, or may be fitted into suitable flat pads of rubber, metal or the like for use on ground which is too hard for this purpose.

Each bottom rail 16 is also rotatably attached to the middle rail so that it can be rotated upwardly for storage purposes, via spaced arms 34,38 extending upwardly from rail 16 and rotatably attached to rail 14 via collars 50, as best illustrated in FIGS. 4 and 5. The clamps or U-brackets 55 will also rotate relative to rail 14 as the bottom rail is raised or lowered. FIG. 2 illustrates the bottom rail folded upwardly into the storage position located adjacent upper rail 12, as also illustrated in dotted outline in FIG. 4. Prior to folding, the bottom rail is first released from end post 44 by releasing fastener 23, retracting telescoping end portion 22 inwardly into rail 16. The legs 56 are then rotated upwardly and coupled with rail 14. Finally, bottom rail 16 is rotated upwardly into the dotted outline position of FIG. 4. At this point, end portion 22 may be extended slightly to re-engage fastener 23 with post 44, holding the rail 16 in the upwardly folded position. It will be apparent that this rail can be readily folded back downwardly when the respective panel is extended, as indicated by the arrow in FIG. 4. Fastener 23 may be any suitable mechanical clamp, clip, fastener, tie, or magnet, for example, in place of the U-shaped clamp illustrated in the drawings.

FIG. 5 also illustrates the releasable latch 48 for holding each telescoping end portion 18,20,22 in the fully extended or retracted positions. Each of the rails 12,14,16 has an opening 49 adjacent its outer end, and the respective telescoping end portion 18,20,22 will have openings 51 which align with opening 49 in the fully extended and retracted positions. A latch 48 is pivotally mounted in each end portion adjacent the openings 49, and will drop into the latched position indicated in FIG. 5 in which it engages in openings 49 and 51 to secure the end portion in position. The latch may be released by pushing it inwardly from the position shown. In an alternative arrangement, a spring loaded pop pin may be mounted on the respective rail 12,14, 16 for releasable engagement through holes 49 and 51 when aligned, and additional holes 51 may be provided in the telescoping end portions 18,20 and 22 if desired, for allowing the side panels to be adjusted between various possible different lengths. The respective side panel can readily be extended by releasing the latches and then pulling post 44 away from the trailer until the desired extension is reached.

The end panel 204 is of similar parallel rail construction to the side panels, but is not telescopically extendible, and is arranged to provide a gate for corral entry and exit purposes. In the embodiment illustrated in FIG. 1, the end panel 204 is formed in two halves, each half pivotally connected to a respective panel end post 44. Each half of the end panel comprises three spaced parallel rails 28,30 and 32. Each upper and middle rail is pivotally connected to the respective end post 44 at one end via a rotatable collar 205 or other hinge connection, as best seen in FIGS. 1 and 5, and secured to a vertical end post 36 at the opposite end. When the end panel is in the deployed condition of FIG. 1, each half panel extends perpendicular to the respective side panel and the end posts 36 are positioned side-by-side, and may be releasably secured together by a suitable latching mechanism (not illustrated). Like the side panel end posts 44, end posts 36 of the two half panels also have a lower telescoping leg 46 which may be extended to provide further support when the end panel is deployed, and which is retracted when the corral is to be collapsed for storage.

The lower rail 32 of each half panel is rotatable relative to the middle rail 30 via collars 50 rotatably mounted on the middle rail 30 and legs 40,42 which secure collars 50 to the respective lower rail. Extendible, releasable C-clamps 23 or the like may be provided at the end of each rail 32 for releasable connection to the end rail 36 in both the lowered and raised positions, as was the case with the lower rail 16 of the side panels. Clamps 23 may be provided at only one end of each rail 32, or at both ends if needed for added security.

FIG. 1 illustrates the corral apparatus in the fully extended and deployed condition. It will be understood that the overall size of the corral may be adjusted simply by sliding each of the side panel rail end portions 18,20,22 inwardly to provide the desired overall area of the corral. One or both end half panels can be opened outwardly by releasing the end posts 36, and swinging each half panel outwardly by pivoting collar 205 about post 44, allowing animals to enter or exit or an owner to enter the corral. When the animals are to be transported to another location, the corral can be readily collapsed for storage. The animals are first secured inside the trailer 24. The two halves of the end panel are then released from each other, the legs 46 are raised, and the lower rails 32 are rotated upwardly and re-secured to the end posts 36 in the storage position, in which each rail 32 is positioned adjacent the upper rail 28 (similar to the dotted line position of FIG. 4 for the side rails).

The end portions of each side panel are then retracted inwardly into the respective rail 12,14 and 16, and the lower legs 54 of each end post 44 are pushed upwardly into the respective post. The lower rails 16 are raised into the upper position illustrated in dotted outline in FIG. 4. At this point, each half panel is rotated in order to lie flat against the respective side panel, with one half panel being rotated outwardly to lie against the outside face of one side panel, and the other half panel being rotated inwardly to lie against the inside face of the other side panel. The first side panel is then rotated inwardly about pivots 26 to lie against trailer wall 24, and the second side panel is rotated inwardly to lie against the first side panel, with the two half panels located between the side panels, as best illustrated in FIG. 3. Suitable securing devices (not illustrated) will be provided for releasably holding the corral apparatus in the collapsed position of FIGS. 2 and 3.

It will be understood that the foregoing operation can be readily reversed in order to deploy the corral apparatus, simply by folding each side panel outwardly, extending the end portions 18,20 and 22 as desired, rotating the half panels perpendicular to the side rails to form a gate, and lowering the lower rails of the side and end panels and the support legs 54,56 and 46. This can be done quickly and easily by one person, and does not require lifting of any heavy weights or handling of a large number of cumbersome fastener devices. Animals in the trailer can then be released into the corral for grazing or the like while the owner is otherwise occupied, or for preparation for a riding event or the like.

Although the end panel is formed from two half panels in the embodiment illustrated in FIGS. 1 to 5, each pivotally mounted on the respective side panel end post, and which can be swung outwardly to provide a gate, it may alternatively be made in one piece, which is pivotally secured at one end to one of the posts 44, and releasably secured to the other post 44. In order to collapse the corral in this case, the end panel is simply released from one of the side panels at one end and folded inwardly against the other side panel. The rails and end posts may all be of lightweight tubular metal of circular cross-section, although they may alternatively be bars of different cross-section such as square. Additionally, instead of forming each side and end panel of vertical posts and horizontal rails, as in the illustrated embodiment, the panels may be of other construction, such as wire grill or wooden fence panels. In this case, each side panel will be formed in two parts, one of which can slide over the other in order to retract for storage purposes and to allow adjustment of the size of the corral.

Figure 8:
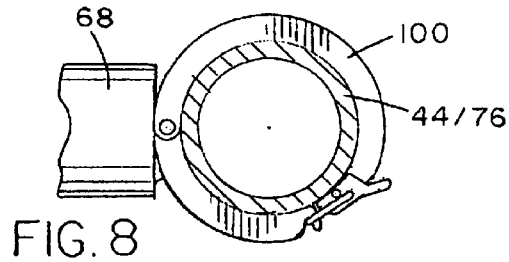
FIG. 8 is a sectional view illustrating a detachable fastener securing a bottom rail to a vertical post in the lowered or raised position.
Figure 7:
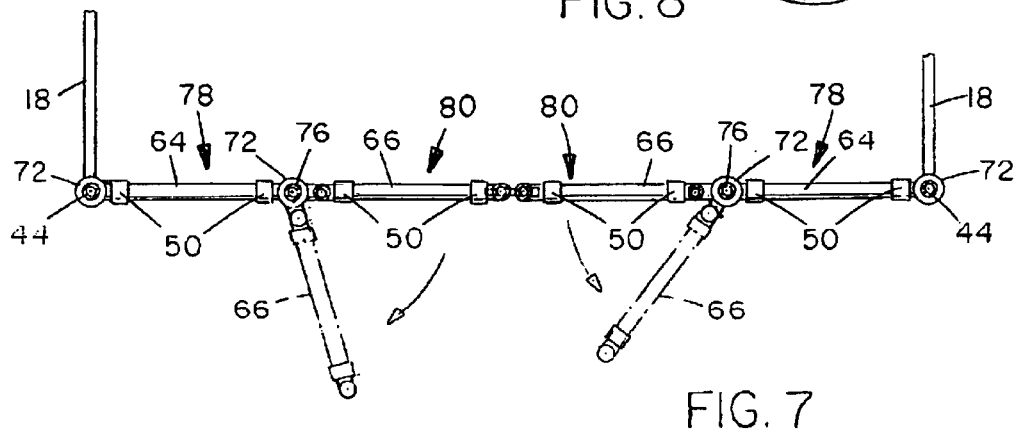
FIG. 7 is top view of the structure of FIG. 6.

FIGS. 6 to 8 illustrate an alternative end panel structure, which allows for a gate for access to the corral while still maintaining the stability. In this alternative, the end panel is still divided into two half panels each pivotally secured to a respective end post 44, and each end panel is further divided into a first half panel portion 78 and a gate portion 80. The first half panel portion 78 has parallel rails 60,64 and 68 each pivotally secured to the post 44 at one end, and to an end post 76 at the other end. Each gate portion 80 also has spaced parallel rails 62, 66 and 70 pivotally secured to post 76 at one end. Rails 62 and 66 are secured to a vertical post 65 at the opposite end, and a retractable latch device 102 is provided at the end of one of the lower rails 70, for engagement with the other rail 70 when the gates are closed, as indicated in FIG. 6. A releasable latch 71 may also be provided for securing the two posts 65 together, as illustrated in FIG. 6, and this may be provided instead of, or in addition to, device 102. Posts 76 may have extendable legs 58 for added stability, as in the previous embodiment. These may be retracted upwardly into the posts and secured by suitable fasteners 59 such as pop pins when the corral is to be stored.

As in the previous embodiment, the upper and middle rails 60 and 64 of each half panel portion 78 are rotatably connected to the posts 44 via collars 205. Each rail 60,64 is rigidly secured to the respective vertical post 76. Each lower rail is rotatably connected to the middle rail 60, as in the previous embodiment, via rotating collars 50 on rail 64 and spaced connecting legs 82 and 84. At the same time, the lower rails 68 are releasably secured to the post 44 at one end and the post 76 at the other end by releasable clamping devices 100, as illustrated in more detail in FIG. 8. The rails 68 can be rotated between the lowered position illustrated in solid outline in FIG. 6, and the raised, storage position illustrated in dotted outline, simply by releasing the clamping devices 100, rotating the rails upwardly by rotating collars 50 about rails 64 until they are adjacent the upper rails 60, and then re-securing the clamping devices 100 to the posts 44 and 76.

The gate portions 80 also have lower rails 70 which are rotatably mounted on the middle rails 66 via collars 50 and connecting legs 86 and 88, and may be rotated into a storage position in a similar manner to the rails 68. The upper and middle rails 62 and 66 are rotatably connected to the respective post 76 via rotatable collars 205, and releasably secured at their outer ends to the posts 76 via collars 100, which are rotatable relative to the respective posts. FIG. 7 illustrates movement of the two gate portions 80 between the closed position illustrated in solid outline, towards an open position, as indicated by the arrows, with the dotted line illustration indicating an intermediate position of each gate portion between the close and open condition. With this arrangement, the gate portions 80 will swing open while the remainder of each half panel, i.e. the first half panel portions 78 remain stationary for added stability. The gate portions 80 may be secured in the closed position by any suitable latch mechanism 71 selected from those known in the art, such as sliding latches, hooks, ties, clamps, or the like.

The end panel of FIGS. 6 to 8 can be collapsed for storage in a similar manner to the previous embodiment, simply by releasing the gate portions 80 from each other, raising the legs 58, rotating each lower rail 68,70 upwardly, and then rotating each half panel inwardly or outwardly, as appropriate, about post 44 until it is flat against the respective side panel. In this embodiment, the major difference from the first version of the corral apparatus is that the gate does not take up the entire end panel, but instead a smaller gate is provided so that a portion of each half panel does not move when the gate is opened or closed. This is a more stable arrangement, since the legs 58 will stay engaged with the ground at all times while the corral is deployed.

The corral apparatus of this invention is lightweight, inexpensive, and is easy to use. Unlike previous corrals for use with animal trailers or the like, it can be readily and quickly deployed by one person. In the illustrated embodiment, the apparatus is shown attached to an animal trailer, such as a horse trailer, but it may alternatively be attached to a recreational vehicle, for example, to be used for holding pets when camping, for example. Alternatively, the apparatus may be attached to a permanent structure such as a house, garage, or other building or a permanent wall or fence, for use in containing or protecting other animals or children. Thus, for example, it may be used to fence off a pool when not in use, or other potentially dangerous area, or to provide a temporary outdoor pen for pets or young children. The corral can also be easily adjusted in size according to the available space. The retractable lower rails of each panel are extended when the corral is deployed, reducing the space under the fence or panel, reducing the risk of an animal inserting its head under the fence panel.

Although some exemplary embodiments of the invention has been described above by way of example only, it will be understood by those skilled in the field that modifications may be made to the disclosed embodiment without departing from the scope of the invention, which is defined by the appended claims.

I claim:

1. A corral apparatus for attachment to a vehicle, trailer, or building, comprising:
    a pair of mounting brackets for securing at predetermined spaced locations on a surface of a vehicle, trailer, or building;
    a first side panel having a first end pivotally secured to one of the mounting brackets and a second end;
    a second side panel having a first end pivotally secured to the other mounting bracket and a second end;
    each of the side panels being adjustable in length;
    a third end panel extending between the second ends of the side panels,
    whereby an enclosure is formed by the surface, side panels, and end panel;
    the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface; and
    said side and end panels each having an upper portion and a lower portion, the lower portion being movably mounted relative to the upper portion for movement between a storage position located against the upper portion and an extended, operative position extending downwardly from the upper portion to engage the ground.

2. The apparatus as claimed in claim 1, wherein at least part of the end panel comprises a gate for entry to and exit from the corral.

3. The apparatus as claimed in claim 2, wherein the end panel comprises two half panels, each half panel having a first end pivoted to the respective side panel and a second end, and a latch device is provided on the half panels for releasably securing the second ends of the half panels together.

4. The apparatus as claimed in claim 3, wherein each half panel comprises a first portion pivotally secured to the second end of the respective side panel and having an inner end, and a second portion pivotally secured to the inner end of the first portion, the second portion comprising a half gate.

5. The apparatus as claimed in claim 1, wherein each side panel comprises at least two parallel horizontal rails, each rail having a first end pivotally linked to a respective mounting bracket and a telescoping end portion extending up to the second end of the panel, and a vertical post at the second end of the panel, each telescoping end portion having a first end telescopically engaged in the respective rail and a second end secured to said post, whereby said end portions are extendable between a retracted position telescoped inwardly into the respective rails and an extended position extending outwardly from the respective rails in order to adjust the length of the side panel.

6. The apparatus as claimed in claim 5, wherein said two rails of each side panel comprise a top rail and a middle rail, and each side panel further includes a bottom rail parallel to the first two rails and spaced below the middle rail, said bottom rail further including a telescoping end portion.

7. The apparatus as claimed in claim 6, wherein said lower portion of each side panel comprises at least two spaced support legs extending downwardly from said bottom rail for engagement with a ground surface.

8. The apparatus as claimed in claim 7, wherein said support legs are rotatably mounted on said bottom rail for rotation between the downwardly extending, operative position and the storage position.

9. The apparatus as claimed in claim 5, wherein each end post has a lower end, and a leg telescopically engaged with said post and projecting from said lower end, the leg having a foot for engaging the ground when the respective side panel is in the deployed position.

10. The apparatus as claimed in claim 5, wherein said end panel has at least two horizontally extending, parallel rails.

11. The apparatus as claimed in claim 10, wherein said end panel has an upper, a middle, and a lower horizontal rail.

12. The apparatus as claimed in claim 5, wherein each rail comprises a hollow tubular member and each end portion comprises a hollow tubular member of the same shape as the rail and smaller dimensions for sliding engagement inside the rail.

13. The apparatus as claimed in claim 1, wherein each side panel comprises first and second telescoping parts, the second part telescoping relative to the first part between a fully extended position in which the side panel has a maximum length and a fully retracted position in which the side panel has a minimum length.

14. The apparatus as claimed in claim 13, wherein each part comprises at least two spaced, horizontal bars, the bars of at least one of said parts comprising a first set of hollow bars, and the bars of the other part being of smaller cross-section than said first set and being in telescoping sliding engagement in said hollow bars.

15. The apparatus as claimed in claim 1, including releasable locking means for releasably locking each panel lower portion in the storage position.

16. A corral apparatus for attachment to a vehicle, trailer, or building, comprising:
 a pair of mounting brackets for securing at predetermined spaced locations on a surface of a vehicle, trailer, or building;
 a first side panel having a first end pivotally secured to one of the mounting brackets and a second end;
 a second side panel having a first end pivotally secured to the other mounting bracket and a second end;
 each of the side panels being adjustable in length;
 a third end panel extending between the second ends of the side panels, whereby an enclosure is formed by the surface, side panels, and end panel;
 the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface;
 each side panel comprising at least two parallel horizontal rails, each rail having a first end pivotally linked to a respective mounting bracket and a telescoping end portion extending up to the second end of the panel, and a vertical post at the second end of the panel, each telescoping end portion having a first end telescopically engaged in the respective rail and a second end secured to said post, whereby said end portions are extendable between a retracted position telescoped inwardly into the respective rails and an extended position extending outwardly from the respective rails in order to adjust the length of the side panel;
 said two rails of each side panel comprising a top rail and a middle rail, and each side panel further including a bottom rail parallel to the first two rails and spaced below the middle rail, said bottom rail further including a telescoping end portion;
 said bottom rail having at least two spaced support legs extending downwardly for engagement with a ground surface;
 said support legs being rotatably mounted on said bottom rail for rotation between a downwardly extending, deployed condition and an upwardly rotated position for storage; and
 each support leg having a foot mounted at its lower end, the foot being of inverted horse-shoe shape.

17. A corral apparatus for attachment to a vehicle, trailer, or building, comprising:
 a pair of mounting brackets for securing at predetermined spaced locations on a surface of a vehicle, trailer, or building;
 a first side panel having a first end pivotally secured to one of the mounting brackets and a second end;
 a second side panel having a first end pivotally secured to the other mounting bracket and a second end;
 each of the side panels being adjustable in length;
 a third end panel extending between the second ends of the side panels,
 whereby an enclosure is formed by the surface, side panels, and end panel;
 the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface;
 each side panel comprising at least two parallel horizontal rails, each rail having a first end pivotally linked to a respective mounting bracket and a telescoping end portion extending up to the second end of the panel, and a vertical post at the second end of the panel, each telescoping end portion having a first end telescopically engaged in the respective rail and a second end secured to said post, whereby said end portions are extendable between a retracted position telescoped inwardly into the respective rails and an extended position extending outwardly from the respective rails in order to adjust the length of the side panel;
 said two rails of each side panel comprising a top rail and a middle rail, and each side panel further including a bottom rail parallel to the first two rails and spaced below the middle rail, said bottom rail further including a telescoping end portion;
 said bottom rail having at least two spaced support leas extending downwardly for engagement with a ground surface;
 said support legs being rotatably mounted on said bottom rail for rotation between a downwardly extending, deployed condition and an upwardly rotated position for storage; and
 each support leg having a free end having a clamp for releasable connection with said middle rail in the storage position.

18. A corral apparatus attachment to a vehicle, trailer, or building, comprising:
 a pair of mounting brackets for securing at predetermined spaced locations on a surface of a vehicle, trailer, or building;
 a first side panel having a first end pivotally secured to one of the mounting brackets and a second end;
 a second side panel having a first end pivotally secured to the other mounting bracket and a second end;
 each of the side panels being adjustable in length;
 a third end panel extending between the second ends of the side panels,
 whereby an enclosure is formed by the surface, side panels, and end panel;

the end panel being pivotally secured to at least one of the side panel second ends, and being movable between a deployed position extending transversely between the side panels and a collapsed position folded inwardly against at least one of the side panels, and the side panels being movable between a deployed position extending outwardly from the surface and a collapsed position folded flat against one another and the surface;

each side panel comprising at least two parallel horizontal rails, each rail having a first end pivotally linked to a respective mounting bracket and a telescoping end portion extending up to the second end of the panel, and a vertical post at the second end of the panel, each telescoping end portion having a first end telescopically engaged in the respective rail and a second end secured to said post, whereby said end portions are extendable between a retracted position telescoped inwardly into the respective rails and an extended position extending outwardly from the respective rails in order to adjust the length of the side panel; and said end panel comprising two half panels, each half panel having a first end pivotally secured to the second end of the respective side panels and a second end, and a vertical post secured to the second end of the half panel, whereby each half panel can be rotated between a storage position flat against a respective side panel and a deployed position extending away from the side panel with the vertical post adjacent the vertical post of the other half panel, and a releasable latch mechanism is mounted on one of said half panel posts for releasable latching engagement with the other half panel post.

19. The apparatus as claimed in claim 18, wherein each half panel has at least two parallel horizontal rails, each rail being pivotally secured to the end post of the respective side panel at one end and being secured to the vertical post at the other end.

20. The apparatus as claimed in claim 19, wherein each half panel has at least three spaced parallel horizontal rails, comprising a top rail, a middle rail, and a bottom rail, the bottom rail being rotatably mounted on the middle rail for rotation between a downwardly extending, deployed position and an upwardly rotated, storage position.

21. A corral for attachment to a livestock trailer comprising:

first and second side panels each having top, middle, and bottom parallel horizontal rails, each of a first diameter, and each spaced at a distance from each other, wherein each rail has first and second ends and wherein the top and middle rails of each side panel are hingedly connected at the first ends of one side of the livestock trailer and pivot approximately perpendicular to the trailer and wherein each of the second ends of the rails are connected to a vertical post located at a distance from the livestock trailer;

each horizontal rail being formed in two telescopically engaged parts moveable between extended and retracted positions to adjust the length of the side panels; and a third, end panel having a top, middle, and bottom parallel horizontal rails, each having first and second ends, wherein the first and second ends of the top and middle rails are hingedly connected to the respective side rail vertical posts such that the side and end panels fold parallel to the outside wall of the livestock trailer for storage of the corral.

22. The corral as claimed in claim 21, wherein the bottom rail of each side panel can be rotated upward and secured to the top rail with a fastener or can be rotated downward and secured to the vertical post with the fastener.

* * * * *